United States Patent Office 2,862,935
Patented Dec. 2, 1958

2,862,935

3,5-DIENIC-7-OXOPREGNANE DERIVATIVES AND PROCESSES

Charles W. Marshall, Skokie, Ill., assignor to G. D. Searle & Co., Chicago, Ill., a corporation of Delaware No Drawing. Application November 29, 1956
Serial No. 624,957

8 Claims. (Cl. 260—397.4)

This invention relates to new and useful pure chemical compounds derived by dehydration of 3-hydroxy-7,20-dioxopregn-5-en-(17 and/or 21)-ols and esters, and to the means by which said dehydration is accomplished. In particular, this invention relates to compounds of the formula

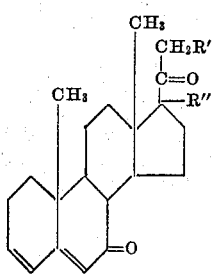

wherein one of the substituents R' and R" is a hydroxyl or alkanoyloxy radical, and the other of these two substituents is hydrogen or a hydroxyl or alkanoyloxy radical.

The alkanoyloxy radicals comprehended by R' and R" in the foregoing representation of the products now disclosed are those having the structure

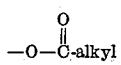

and among these, lower alkanoyloxy radicals are preferred. The latter radicals are those in which the alkyl substituent is methyl, ethyl, propyl, isopropyl, butyl, isobutyl, sec-butyl, tert-butyl, pentyl, isopentyl, tert-pentyl, neopentyl, hexyl, isohexyl, heptyl, octyl, or like $C_nH_{2n+1}$ grouping wherein $n$ is an integer amounting to less than 9.

It will be apparent to those skilled in the field of chemistry that the subject compositions comprise a substantial departure from the prior art in providing, as they do, a 3,5-dienic-7-oxo substructure in steroids characterized by the presence of an alcohol or ester grouping adjacent to a 20-carbonyl. Ketol and ketol ester side-chains of the type described are highly sensitive to the action of acids and alkalis ordinarily used to effect dehydration at the steroidal 3-position. Thus, for example, 3β,17α-dihydroxypregn-5-ene-7,20-dione, 3β,21-dihydroxypregn-5-ene-7,20-dione, 3β,17α,21-trihydroxypregn-5-ene-7,20-dione, their esters, and the like, on short-term (of the order of 1 hour) heating or prolonged (of the order of 24 hours) standing at room temperatures with a strong acid or base in either aqueous or alcoholic solution commonly are isomerized to wholly undesirable heterosteric products. The present invention offers access to dehydration products of the aforesaid 3-hydroxy steroids wherein the integrity of the adreno-cortical side-chain is uniformly preserved.

The compounds of this invention possess valuable pharmacological properties. Especially, the subject compositions are useful because of their selective anti-hormonal activity: they block the atrophying effect of cortisone on lymph nodes and thymus, counteract its tendency to promote the spread of Coxsackie virus and like infections, but share with cortisone a capacity for protecting against iritic hyperemia.

The procedure devised for manufacture of the products herein set forth involves preliminary protective esterification of a corresponding steroidal 3-hydroxy-5-en-7-one, followed by heating at substantially 100–130° C. in the presence of an alkanoic acid containing merely catalytic amounts—preferably, 0.1 to 1.0%—of a strong acid such as p-toluenesulfonic acid for a period of time ranging between ½ and 1½ hours. Ester interchange is avoided by selection of reactants such that protective functions and reaction medium comprise identical acyl radicals. The esters of this invention are saponified by brief (of the order of 10 minutes) treatment at room temperatures with theoretical equivalents of bases; and the alcohols, in turn, are generally re-esterified by, for example, standing at room temperatures with theoretical equivalents of an appropriate acid anhydride or chloride in the presence of an anhydrous, solvent base, such as pyridine.

The following examples describe in detail certain of the 3,5-dienic-7-oxo steroids illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (°C.) and relative amounts of materials in parts by weight, except as otherwise noted. "w./v." and "v./v." are abbreviations used to designate weight by volume and volume by volume, respectively; and the symbols "$\mu$" and "m$\mu$" refer to microns and millimicrons, respectively, which are units of wave length.

*Example 1*

A. *21 - acetoxypregna - 3,5 - diene - 7,20 - dione.*—To 10 parts of 3β,21-diacetoxypregn-5-ene-7,20-dione in 200 parts of glacial acetic acid is added 1 part of p-toluenesulfonic acid monohydrate; and the mixture, protected by a nitrogen atmosphere, is heated at the boiling point under reflux for 1 hour. The reactants are then rapidly chilled and diluted, during agitation, with 240 parts of cold water, whereupon a crystalline product is thrown down. After standing 1 hour at 0–5° C. to assure complete precipitation, the product is collected on a filter, washed thereon with cold waer, and dried in air. A second crop of crystals is obtained by diluting the filtrate with water q. s. 4–5% (v./v.) acetic acid, extracting with ethyl acetate, washing the extract until neutral, evaporating to dryness, and crystallizing the residue from methanol. The first crop is recrystallized from a mixture of acetone and methanol to give pure 21-acetoxypregna-3,5-diene-7,20-dione, melting at 173–174° C. (corr.). The product displays a specific rotation of −219° in chloroform solution and has the formula

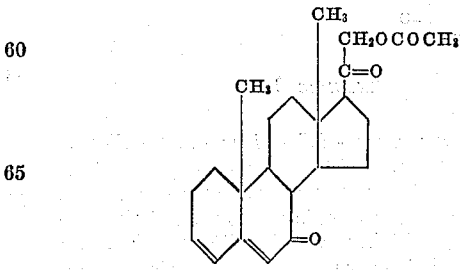

B. *21 - hydroxypregna - 3,5 - diene - 7,20 - dione.*—To a solution of 4 parts of 21-acetoxypregna-3,5-diene-7,20-dione in 80 parts of purified dioxane at 65° C. is added, with agitation, 32 parts of methanol. There is then quickly added to the resultant solution, pre-cooled to 25° C., 110 parts of methanol in which is dissolved approximately 8 parts of caustic potash, the addition being carried out under nitrogen during vigorous agitation. Agitation is continued at 25° C. for 4 minutes, whereupon 8 parts of aqueous 95% (v./v.) methanol is introduced. Approximately 5 minutes later, agitation is discontinued; and the reactants are rapidly chilled to 10° C., acidified with 75 parts of cold aqueous 2% (v./v.) acetic acid, and at last intimately combined with 2000 parts of cold aqueous 5% brine. The precipitate which forms is collected on a filter, washed thereon with cold water, and dried in air. Recrystallization from methanol yields 21-hydroxypregna-3,5-diene-7,20-dione, characterized by a maximum in the ultraviolet spectrum at 278 m$\mu$, and by principal bands in the infrared spectrum at 2.88, 5.84, 6.08, 6.17, and 6.28 $\mu$. Log $E_{mol}$ is 4.34 as determined in methanol solution. The product has the formula

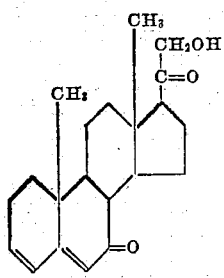

C. *21-heptanoyloxypregna-3,5-diene-7,20-dione.*—To a solution of 5 parts of 21-hydroxypregna-3,5-diene-7,20-dione in 50 parts of pyridine under an atmosphere of dry nitrogen is added 5 parts of heptanoyl chloride. The reactants are thoroughly mixed and then let stand at room temperatures overnight. They are, at this point, dumped into 1000 parts of cold aqueous 5% (w./v.) sodium bicarbonate, the resultant mixture being maintained with agitation for 1 hour. Precipitated solids are removed by repeated extraction with ethyl acetate; and the extracts are then combined and washed, first with aqueous 5% (w./v.) muriatic acid, and finally with water. Thus purified, the extracts are dried over anhydrous sodium sulfate, whereupon solvent is removed by vacuum distillation. The residue is 21-heptanoyloxypregna-3,5-diene-7,20-dione, which is still further purified by recrystallization from a mixture of acetone and methanol. The product is characterized by maxima in the infrared spectrum at 5.72, 5.81, 6.04, 6.14 and 6.25 $\mu$. It has the formula

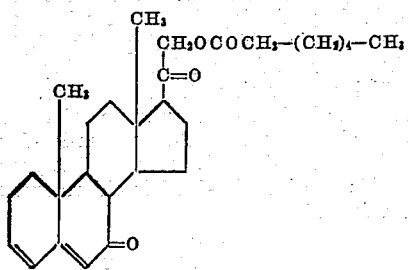

*Example 2*

A. *17$\alpha$ - acetoxypregna - 3,5 - diene - 7,20 - dione.*—Approximately 12 parts of 3$\beta$,17$\alpha$-diacetoxypregn-5-ene,7,20-dione is treated with 180 parts of glacial acetic acid and 1 part of p-toluenesulfonic acid substantially as described in Example 1A hereinabove. Work-up in accordance with the technique there detailed affords pure 17$\alpha$-acetoxypregna - 3,5 - diene-7,20-dione, which, recrystallized from ethyl acetate, melts at 234–236° C. (corr.).

The product has the structural formula

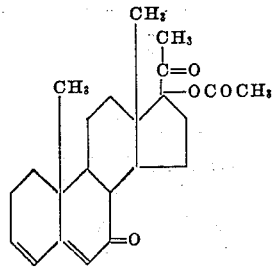

B. *17 - hydroxypregna - 3,5 - diene - 7,20 - dione.*—To a solution of 3 parts of 17$\alpha$-acetoxypregna-3,5-diene-7,20-dione in 100 parts of dioxane at 80° C. is added, with agitation, 160 parts of methanol. To this solution, in turn, cooled at 30° C. is added, with continued agitation under a nitrogen atmosphere, 40 parts of aqueous 2 N caustic potash. Agitation is then discontinued and the mixture stored at 25° C. for 4 hours, whereupon it is chilled to 5° C. and acidified with 200 parts of cold aqueous 5% (v./v.) acetic acid. The mixture is then intimately combined with 4000 parts of cold aqueous 5% brine; and the precipitate which forms is collected on a filter, washed thereon with cold water, and dried in air. The crystalline solids, which melt at 217–218° C. (corr.), are recrystallized from ethyl acetate to yield long, fine needles of pure product, the melting point of which is 223–224° C. (corr.). The 17$\alpha$-hydroxypregna-3,5-diene-7,20-dione thus obtained is strongly levorotatory, displaying a specific rotation of —387° in chloroform solution. The product has the formula

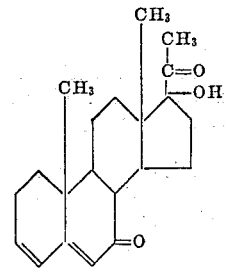

*Example 3*

A. *17$\alpha$,21 - diacetoxypregna - 3,5 - diene - 7,20 - dione.*—Approximately 13 parts of 3$\beta$,17$\alpha$,21-triacetoxypregn-5-ene-7,20-dione is treated with 200 parts of glacial acetic acid and 1 part of p-toluenesulfonic acid by the procedure of Example 1A to give 17$\alpha$,21-diacetoxypregna-3,5-diene-7,20-dione, which, upon crystallization from methanol, melts at 195–197° C. (corr.) and shows a specific rotation in chloroform solution of —313°. The product has the formula

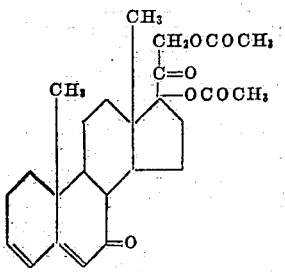

B. *17$\alpha$,21 - dihydroxypregna - 3,5 - diene - 7,20 - dione.*—Approximately 10 parts of 17$\alpha$,21-diacetoxypregna-3,5-diene-7,20-dione is subjected to anhydrous base-catalyzed ester cleavage, using 180 parts of dioxane, 320 parts of methanol, and 17 parts of caustic potash in accordance with the reaction procedure and work-up technique detailed in Example 1B hereinbefore. The dilute, brine-precipitated solids, upon recrystallizing alternately from ethyl acetate and methanol, yield pure 17$\alpha$,21-dihydroxypregna-3,5-diene-7,20-dione, melting at approximately 216–216.5° C. (corr.). The product evinces a strong optical levorotatory effect, the specific rotation being —338° in chloroform solution, 17α21-dihydroxy-pregna-3,5-diene-7,20-dione has the formula

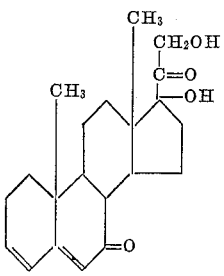

What is claimed is:
1. A compound of the formula

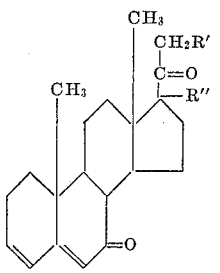

wherein one of the substituents R' and R" is selected from the group consisting of hydroxy and lower alkanoyloxy radicals, and the other of these two substituents is selected from the group consisting of hydrogen and hydroxy and lower alkanoyloxy radicals.

2. A compound of the formula

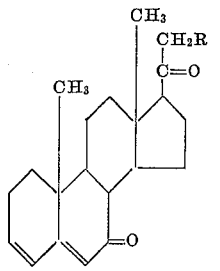

wherein R is a lower alkanoyloxy radical.

3. 21-acetoxypregna-3,5-diene-7,20-dione.
4. 17α-hydroxypregna-3,5-diene-7,20-dione.
5. 17α,21-dihydroxypregna-3,5-diene-7,20-dione.
6. 17α-acetoxypregna-3,5-diene-7,20-dione.
7. 17α,21-diacetoxypregna-3,5-diene-7,20-dione.
8. In a process for the manufacture of compounds of the formula

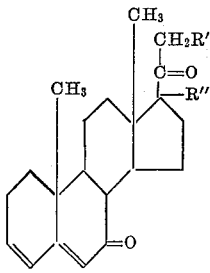

wherein one of the substituents R' and R" is selected from the group consisting of hydroxy and lower alkanoyloxy radicals, and the other of these two substituents is selected from the group consisting of hydrogen and hydroxy and lower alkanoyloxy radicals, the step which comprises heating, for ½ to 1½ hours at 100–130° C. in the presence of an alkanoic acid reaction medium containing 0.1–1.0% of p-toluenesulfonic acid, a steroid of the formula

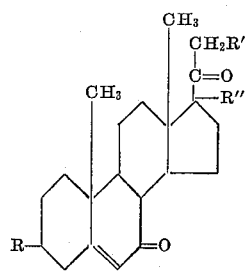

wherein R and one of the substituents R' and R" is a lower alkanoyloxy radical, and the remaining substituent is selected from the group consisting of hydrogen and lower alkanoyloxy radicals, each lower alkanoyloxy radical being identical with that present in the reaction medium.

No references cited.